United States Patent

[11] 3,604,664

| [72] | Inventor | Francis J. Mahoney |
| | | Santa Monica, Calif. |
| [21] | Appl. No. | 852,002 |
| [22] | Filed | Aug. 21, 1969 |
| [45] | Patented | Sept. 14, 1971 |
| [73] | Assignee | Lear Siegler, Inc. |
| | | Santa Monica, Calif. |

[54] POSITIONAL CONTROL SYSTEM
32 Claims, 4 Drawing Figs.
[52] U.S. Cl. .................................................. 244/84, 74/388
[51] Int. Cl. ........................................................ B64c 13/12
[50] Field of Search .......................................... 244/84, 83, 83.3, 83.7, 77, 77 F, 89, 87; 74/388, 665

[56] References Cited
UNITED STATES PATENTS

| 2,974,908 | 3/1961 | Platt | 244/83 X |
| 3,067,970 | 12/1962 | Divola | 244/83 |
| 3,472,086 | 10/1969 | Iwasaki et al. | 244/83 X |
| 2,922,796 | 7/1961 | Wheldon | 244/83 X |

Primary Examiner—Trygve M. Blix
Assistant Examiner—Carl A. Rutledge
Attorney—Christie, Parker & Hale ABSTRACT: A control system in which an output member is positioned so its displacement is proportional to the displacement of a plurality of input members. Signals are generated that have a characteristic, e.g., amplitude or pulse-repetition rate, representative of the rate of change of the displacement of the input members. The signals are combined so the characteristics add. A feedback signal is generated that has a characteristic representative of the movement of the output member. The output member is positioned responsive to the combined signal and the feedback signal such that the displacement of the output member is proportional to the sum of the individual displacements of the input members. In one embodiment, the characteristic of the feedback signal is representative of the rate of change of the displacement of the output member, and the output member is positioned responsive to the difference between the characteristic of the feedback signal and the combined signal. In other embodiments, the characteristic of the feedback signal is representative of the displacement of the output member, and the output member is positioned responsive to the difference between the integral of the characteristic of the combined signal and the characteristic of the feedback signal.

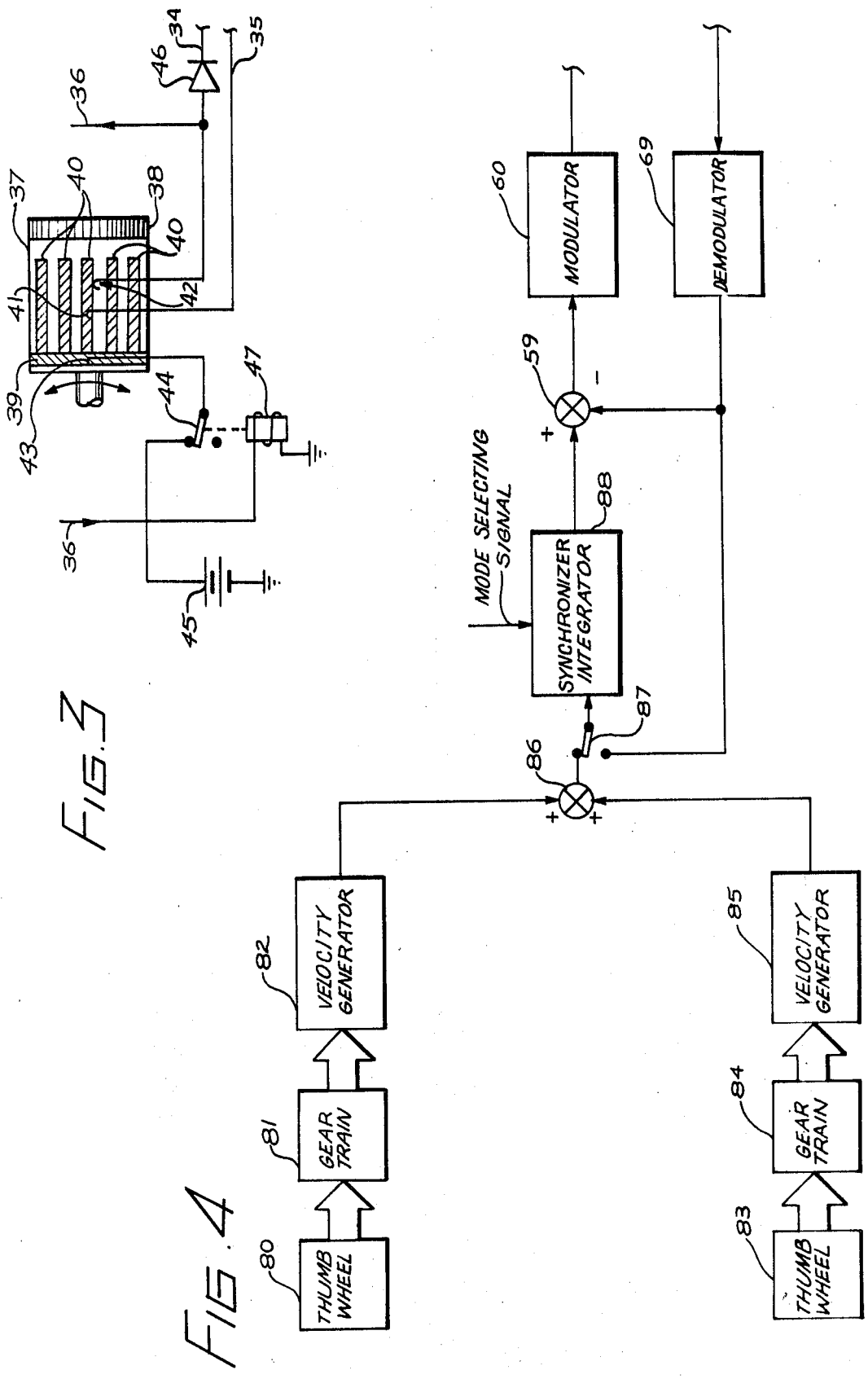

POSITIONAL CONTROL SYSTEM

BACKGROUND OF THE INVENTION

This invention relates to the automatic control of a movable member and, more particularly, to a positional control system that is well suited to receive input commands from a plurality of independent sources and to position a movable member responsive to the sum of the individual commands.

There are a number of applications for a positional control system in which a remotely located movable member is positioned responsive to a plurality of command inputs such that the displacement of the remote member is proportional to the sum of the displacements of the command inputs. One example is the manual trim system of a commercial aircraft. There, the requirement exists that the pilot and the copilot both be able to introduce manual trim commands through their own individual cockpit controls independently of the other. It has been found particularly advantageous to provide a thumb wheel on each control wheel as a means of manually introducing aircraft trim. Either the pilot or the copilot must be capable of introducing trim by rotating his thumb wheel without affecting the other thumb wheel; the resultant displacement of the trim mechanism is proportional to the sum of the displacements of the individual thumb wheels.

It is possible to control the position of a remote member responsive to the sum of the displacements of a plurality of command inputs by establishing a mechanical interconnection between the various command inputs. In order to isolate the movements of the command input members from each other, they are commonly coupled to the remote member through a differential gear assembly and associated mechanical linkages. The great bulk and complexity of these mechanical components are unacceptable in some applications, such as the thumb wheels on aircraft control wheels. In such case, an electrical interconnection is established between the command input members and the remote member. With an electrical interconnection there is no difficulty in isolating the command inputs from each other.

The customary technique for implementing a positional control system with an electrical interconnection between a single command input member and a remote member is to generate an electrical signal representative of the displacement of the command input member by means of a potentiometer connected across a signal source. The wiper arm of the potentiometer is connected to the command input member so the percentage of the signal amplitude appearing at the wiper arm varies as the command input member is displaced. Unfortunately, this technique is not satisfactory when it is used to interconnect a plurality of command input members. The difficulty is that the potentiometer inherently establishes a positional reference with respect to which displacement of the input member is measured. Each command input member has stops that limit its displacement from the positional reference to some maximum value corresponding to the point where the attached wiper arm reaches the end of its potentiometer. The stops can prevent full exercise of control by each of the command input members under some circumstances. An example will serve to illustrate this fact in a manual trim system. Assume that the pilot rotates his thumb wheel in one direction to its stop while the copilot is rotating his thumb wheel in the opposite direction to its stop. The sum of the displacements of the two thumb wheels is zero so no trim is introduced. Despite this fact, because the thumb wheels are against the stops, the pilot can only introduce trim in one direction, i.e., away from his stop, and the copilot can only introduce trim in the opposite direction, i.e., away from his stop.

To prevent the loss of control that can occur due to the provision of stops to limit the displacement of the command inputs, the command inputs can be interconnected by a synchro, which provides an electrical signal representative of the difference between the displacements of the command inputs without establishing individual positional references therefor. In applications having stringent space limitations, however, such as the thumb wheels of aircraft control wheels, small delicate synchros must be used, which transfer noticeable heat into the wheel and also require relatively complex associated circuitry.

SUMMARY OF THE INVENTION

The invention contemplates a displacement proportional control system in which a signal is generated that has a characteristic representative of the rate of change of the displacement of the command input member. Consequently, no stops need be provided to limit the displacement of the command input because there is no positional reference with respect to which the signal increases in amplitude as the displacement of the command input increases. To the contrary, the generated signal remains constant while the displacement of the command input increases uniformly. Further, no synchros are required to coordinate the movements of plural command inputs. The rate-representative signals are simply combined. The only component that must be mechanically coupled to the command input is a rate-representative signal generator. Commercially available devices that generate such a signal are small, reliable, and accurate. The generator output can be electrically connected to a remote point, where more space is available for the other components of the control system.

At the remote point, individual rate-representative signals are combined to form a command signal that has a characteristic representative of the sum of the characteristics of the individual signals. A feedback signal is generated that has a characteristic representative of the movement of the remote member to be controlled. The remote member is moved in response to the command signal and the feedback signal such that the displacement of the remote member is proportional to the sum of the displacements of the command inputs. The result is a simple and reliable positional control system that is responsive to a plurality of command inputs that are independently movable without stops to limit their displacement.

In one embodiment, the command signal characteristic is amplitude, and the amplitude of the feedback signal is representative of the rate of change of the displacement of the remote member, which is controlled in response to the difference between the command signal and the feedback signal. It is advantageous in this embodiment to apply the command signal and the feedback signal to a summing junction and to couple the output of the summing junction to an actuator that drives the remote member through a normally open switch. The switch is closed when the signal generated by any of the command inputs exceeds a predetermined threshold level. The output of the summing junction is substantially amplified to improve the response of the control system. Low-level spurious signals introduced into the system do not affect the actuator because the control loop is open unless one of the command inputs is actually being displaced. The remote member is connected to the actuator by a unilateral coupling device that permits it to be moved only by the actuator. Thus, the position of the remote member does not change while the control loop is open.

In other embodiments, the feedback signal has a characteristic representative of the displacement of the remote member, which is controlled responsive to the difference between a signal representative of the integral of the characteristic of the command signal and the feedback signal. In one case, the characteristic of the generated signals is signal amplitude and the command signal is applied to an integrator to form the integral of the characteristic. In another case, the characteristic of the generated signal is pulse frequency and the command signal is applied to a digital counter to form the integral of the characteristic.

BRIEF DESCRIPTION OF THE DRAWINGS

The features of several embodiments of the best mode contemplated of carrying out the invention are illustrated in the drawings, in which:

FIG. 3 is a schematic diagram of one of the pulse generators of FIG. 2; and

FIG. 4 is a schematic diagram partially in block form of a third positional control system.

DETAILED DESCRIPTION OF THE SPECIFIC EMBODIMENTS

Figure 1:
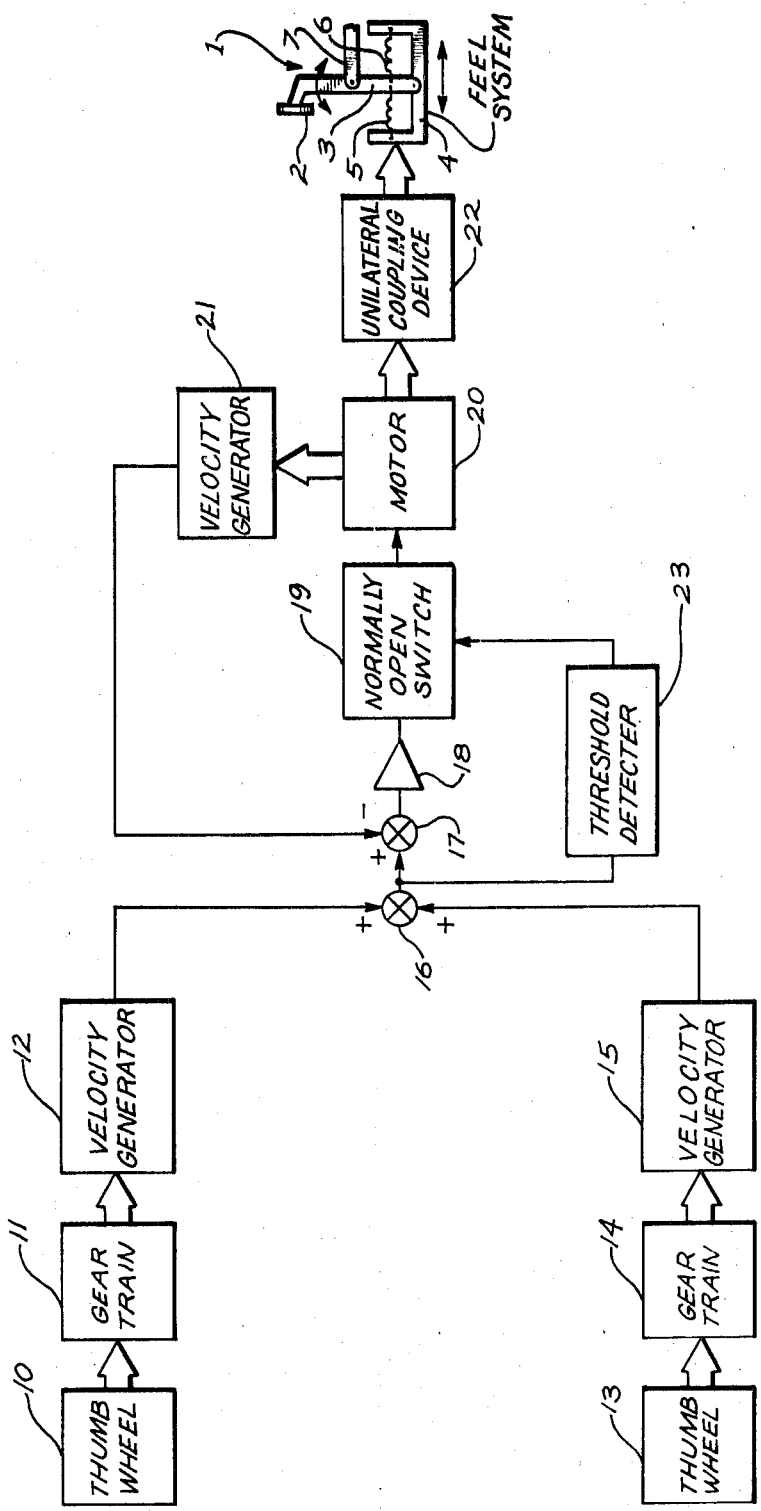
FIG. 1 is a schematic diagram partially in block form of one positional control system.

In FIG. 1, a positional control system is shown that permits the pilot and copilot of an aircraft to introduce trim manually. For the purpose of illustration, it is assumed that the entire horizontal stabilizer of the aircraft pivots as the pitch-control surface, there being provided no actual trim tab. In such an arrangement, the function of a trim tab is simulated by a feel system 1 for a pilot control wheel 2. Feel system 1 is depicted schematically in FIG. 1. Control wheel 2 is attached to one end of a linkage 3. The other end of linkage 3 is pivotally connected to a frame 4, which is slidable in a horizontal direction, as depicted by the straight arrow below frame 4. Springs 5 and 6 are attached between opposite sides of linkage 3 and frame 4 so as to exert a restoring force on linkage 3 when it is pivoted away from the vertical position, as depicted by the curved arrow. A linkage 7 connects linkage 3 to the actuator for the horizontal stabilizer of the aircraft. Thus, when the pilot introduces a pitch command by pivoting control wheel 2 to the left or to the right, as viewed in FIG. 1, this command is coupled by linkages 3 and 7 to the actuator for the horizontal stabilizer. Springs 5 and 6 provide a feel, i.e., a resistance to the movement of control wheel 2. When the pilot wants to hold the horizontal stabilizer in a particular position, he slides frame 4 by means of the positional control system disclosed in FIG. 1. By sliding frame 4, linkage 3 is horizontally translated in its vertical position and linkage 7 is moved. Thus, moving frame 4 is equivalent to moving an elevator tab in an aircraft provided with one.

In the drawings, the wide arrows represent mechanical connections between components and the lines represent electrical connections between components. In FIG. 1, a pilot's thumb wheel 10 is mechanically connected through a gear train 11 to a velocity generator 12. Similarly, a copilot's thumb wheel 13 is mechanically connected through a gear train 14 to a velocity generator 15. Thumb wheel 10, gear train 11, and velocity generator 12 are physically located in the pilot's control wheel; thumb wheel 13, gear train 14, and velocity generator 15 are physically located in the copilot's control wheel. These elements occupy very little space in the control wheels. Thumb wheels 10 and 13 are rotatably mounted on their respective control wheels without any stops, i.e., they can be rotated indefinitely in either direction, and are located so the pilot or copilot can spin them with his thumb while his hands are gripping the control wheel in the normal fashion. Velocity generators 12 and 15 each produce an electrical signal that is proportional to the rate of change of the angular displacement of thumb wheel 10 and 13, respectively. The constant of proportionality is in part determined by the gear ratio of gear trains 11 and 14. The outputs of velocity generators 12 and 15 are applied to a summing junction 16, where they are additively combined, as depicted by the mathematical signs in FIG. 1. The output of summing junction 16 is coupled through a summing junction 17 to the input of an amplifier 18. The output of amplifier 18 is coupled through a normally open switch 19 to the electrical input of a motor 20, which serves as the actuator for feel system 1. A velocity generator 21 is mechanically connected to motor 20. Velocity generator 21 produces an electrical feedback signal proportional to the rate of change of shaft displacement of motor 20. This feedback signal is applied to the other input of summing junction 17, where it is differentially combined with the output of summing junction 16, as depicted by the mathematical signs in FIG. 1. A unilateral coupling device 22, such as a worm gear arrangement, connects the shaft of motor 20 to frame 4. Therefore, as the shaft of motor 20 rotates, frame 4 slides. Due to unilateral coupling device 22, however, frame 4 is not capable of transmitting forces exerted on it back to the shaft of motor 20 or capable of moving independently of the shaft of motor 20. In short, frame 4 moves only when motor 20 is energized.

The output of summing junction 16 is also applied to a threshold detector 23. When the sum of outputs of velocity generators 12 and 15 exceeds a predetermined threshold level, threshold detector 23 generates an electrical signal that is coupled to switch 19, thereby closing switch 19. When switch 19 is closed, there is formed a closed-loop control system that drives motor 20 responsive to the output of velocity generator 21 and summing junction 16. Thus, the rate of change of shaft displacement of motor 20 follows the sum of the rates of change of displacement of thumb wheels 10 and 13. Accordingly, the displacement of motor 20 per se also follows the sum of the displacements of thumb wheels 10 and 13 per se. In other words, the arrangement of FIG. 1 functions as a displacement proportional control system.

While neither the pilot nor copilot is rotating his thumb wheel, threshold detector 23 does not close switch 19. Therefore, the control system is inoperative, so the effects of drift of amplifier 18 and noise do not influence motor 20 during periods when no trim is being introduced. The presence of switch 19 permits amplifier 18 to have a much larger gain without having to suffer the effects of the correspondingly larger drift and noise. In some circumstances, sufficient accuracy may be obtained without switch 19 and threshold detector 23. In such case, the control loop would be closed at all times even when no trim is being introduced.

It is to be noted that unilateral coupling device 22 prevents frame 4 from moving unless motor 20 is actuated. Therefore, feel system 1 is prevented from moving or drifting under the influence of springs 5 and 6 while switch 19 is open.

Preferably, summing junctions 16 and 17, threshold detector 23, switch 19, and amplifier 18 are located near the control wheels so amplifier 18 is as close as possible to velocity generators 12 and 15. Then, the electrical connection leading to amplifier 18 generates a minimum of noise because it is short. The electrical lead between switch 19 and motor 20 would then be substantially as long as the distance between thumb wheels 10 and 13 and feel system 1.

Figure 2:
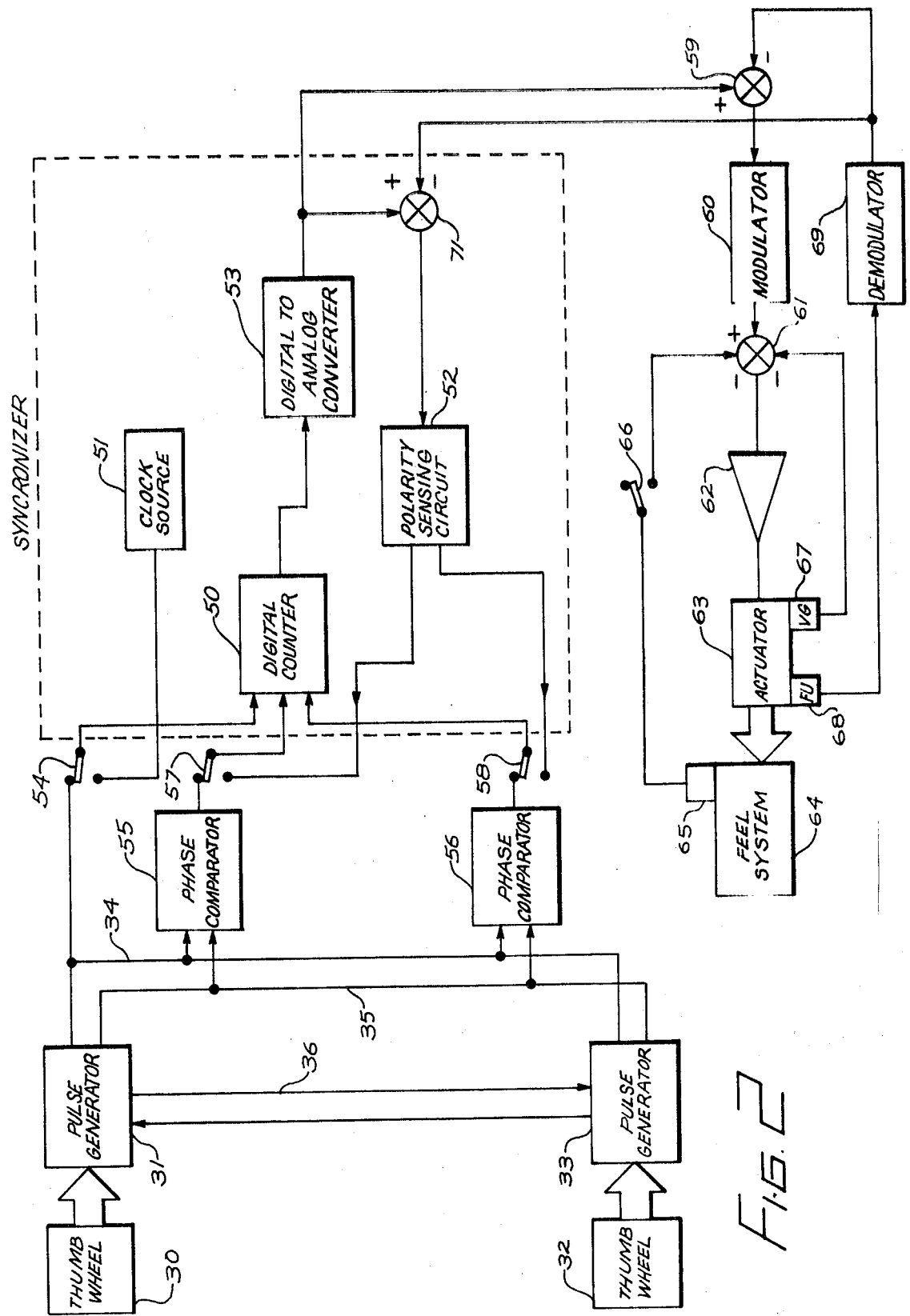
FIG. 2 is a schematic diagram partially in block form of another positional control system.

In FIG. 2 an embodiment is shown that employs displacement feedback, as distinguished from the rate feedback in FIG. 1. A pilot's thumb wheel 30 is mechanically coupled to a pulse generator 31, and a copilot's thumb wheel 32 is mechanically coupled to a pulse generator 33. Pulse generators 31 and 33 each have two outputs that are connected to pulse-transmitting busses 34 and 35. As one of the thumb wheels is rotated, the corresponding pulse generator produces at each of its outputs one pulse for each predetermined increment of angular displacement. When the thumb wheel is rotated in one direction, the pulses at one output of the pulse generator lead the pulses at the other output by 90°, and when the thumb wheel is rotated in the opposite direction, the pulses generated at one output lag the pulses generated at the other output by 90°. While one pulse generator is producing pulses, it provides a disabling signal over one of a pair of leads 36 to the other pulse generator. Thus, only one pulse generator produces pulses at any one time.

Reference is made to FIG. 3 for an exemplary embodiment of one of pulse generators 31 and 33 that is formed integrally with a thumb wheel. A rotatably drum 37 has a thumb wheel 38 formed around its circumference at one end. At the other end, a band 39 of electrically conductive material is formed around its circumference. Bands 40 of electrically conductive material are formed at equal increments of angular displacement along the circumference of drum 37. Bands 40 are parallel to the axis of drum 37. The surface of drum 37 between bands 40 is electrically insulative. Electrical contact brushes 41 and 42, which are held in contact with the surface of drum 37 at all times, comprise the outputs of the pulse generator that are connected to busses 34 and 35. As depicted in FIG. 3, brush 41 protrudes slightly further than brush 42. Thus, when drum 37 rotates in one direction, brush 41 contacts each of bands 40 slightly before brush 42, and when drum 37 rotates in the other direction, brush 42 contacts each of bands 40 slightly before brush 41. An electrical contact brush 43 is held in contact with the surface of band 39 at all times. Brush 43 is connected through a normally closed switch 44 to a source of electrical energy shown as a battery 45. Therefore, as the pilot or copilot rotates thumb wheel 38, drum 37 rotates to produce a pair of pulses each time brushes 41 and 42 pass over one of bands 40. One of leads 36 connects brush 42 to the other pulse generator. A diode 46 is connected between this lead 36 and bus 34 so pulses from the other pulse generator are not coupled to this lead 36 by bus 34. The other lead 36 connects the same brush of the other pulse generator to a relay coil 47, which controls switch 44. Coil 47 has a slow release time so it remains energized while pulses are applied to it above some predetermined minimum threshold rate. Thus, when the other pulse generator is producing pulses at a rate above the predetermined minimum rate, relay coil 47 is energized and contact 44 is opened, thereby inhibiting further generation of pulses as drum 37 rotates.

In FIG. 2 a synchronizer is provided which comprises a reversible digital counter 50, a clock source 51, a polarity-sensing circuit 52, and a digital-to-analog converter 53. For exemplary embodiments of these components reference is made to Tippetts U.S. Pat. No. 3,404,857, which issued on Oct. 8, 1968, to the assignee of the present application.

Bus 34 is connected through a switch 54 to the pulse-counting input of counter 50. Busses 34 and 35 are directly connected to phase comparators 55 and 56. The output of phase comparator 55 is connected through a switch 57 to one counting direction determining input of counter 50 and the output of phase comparator 56 is connected through a switch 58 to the other counting direction determining input of counter 50. Counter 50 counts the sum of the pulses produced by pulse generators 31 and 33. Phase comparators 55 and 56 control the direction in which counter 50 counts, so counter 50 reflects the direction of rotation of thumb wheels 30 and 32, as well as the magnitude of the rotational displacement thereof. The frequency of the pulses produced by each pulse generator is proportional to the rate of change of the displacement of its thumb wheel. Counter 50 integrates this pulse frequency. The output of counter 50 is connected to digital-to-analog converter 53, which produces at its output an analog signal proportional to the number of pulses counted by counter 50. This represents the sum of the angular displacements of thumb wheels 30 and 32, assuming only one thumb wheel is rotated at a time. The output of digital-to-analog converter 53 is coupled through one input of a summing junction 59 to the input of a modulator 60. The output of modulator 60 is connected to one input of a summing junction 61. The output of summing junction 61 is connected through an amplifier 62 to the electrical input of an actuator 63, which positions a feel system 64. Feel system 64 could be identical to feel system 1. A transducer 65 produces an electrical signal proportional to the force applied to feel system 64. This signal is coupled through a switch 66 to another input of summing junction 61, where it is differentially combined with the signal from modulator 60, as depicted by the mathematical signs in FIG. 2. A velocity generator 67 produces an electrical signal proportional to the rate of change of displacement of actuator 63. This signal is applied to another input of summing junction 61, where it is differentially combined with the output of modulator 60, as depicted by the mathematical signs in FIG. 2. A followup transducer 68 produces an electrical signal proportional to the displacement of actuator 63. This signal is applied to a demodulator 69. The output of demodulator 69 is coupled to the other input of summing junction 59, where it is differentially combined with the output of digital-to-analog converter 53, as depicted by the mathematical signs in FIG. 2.

When switches 54, 57, 58, and 66 are in their upper positions, as shown in FIG. 2, the control system functions in a manual trim mode. As the pilot or copilot introduces trim by rotating his thumb wheel, a signal proportional to the displacement of the thumb wheel is produced at the output of digital-to-analog converter 53. Actuator 63 follows the output of digital-to-analog converter 53 so as to drive the output of summing junction 59 toward zero. In this way, feel system 64 is positioned responsive to the commands applied to the thumb wheels.

When switches 54, 57, 58, and 66 are placed in their lower position, the control system of FIG. 2 operates in an automatic trim mode. The output of demodulator 69 is coupled to one input of a summing junction 71, where it is differentially combined with the output of digital-to-analog converter 53. The output of summing junction 71 is connected to the input of polarity sensing circuit 52. Polarity sensing circuit 52 has two outputs that are coupled through switches 57 and 58, respectively, to the counting direction determining inputs of counter 50. The output of clock source 51 is coupled through switch 54 to the pulse-counting input of counter 50. As a result, the output of digital-to-analog converter 53 follows the displacement of actuator 63 as represented by followup transducer 68. Actuator 63 is, in turn, driven by transducer 65 to maintain the feel system forces applied to the control wheel on the average at null.

In FIG. 4 is shown another embodiment that employs a feedback signal proportional to displacement. A pilot's thumb wheel 80 is mechanically connected through gear train 81 to a velocity generator 82. A copilot's thumb wheel 83 is mechanically connected through a gear train 84 to a velocity generator 85. The outputs of velocity generators 82 and 85, which are electrical signals proportional to the rate of change of angular displacement of their respective thumb wheels, are applied to the inputs of a summing junction 86, where they are additively combined, as depicted by the mathematical signs in FIG. 4. The output of summing junction 86 is connected through a switch 87 to a synchronizer-integrator 88, which could be identical to the signal generator disclosed in the above mentioned Tippetts patent. Under the control of a mode-selecting signal, synchronizer-integrator 88 either functions as a synchronizer or as an integrator. In a manual trim mode, it functions as an integrator. Therefore, the output of synchronizer-integrator 88 is an analog signal whose amplitude is proportional to the sum of the displacements of thumb wheels 80 and 83. This signal is used in the same manner as the output of digital-to-analog converter 53 in FIG. 2. In an automatic trim mode, switch 87 is placed in its lower positions and the mode selecting signal converts synchronizer-integrator 88 to a synchronizer. Thereafter, the output of synchronizer-integrator 88 follows the output of demodulator 69.

In all three embodiments disclosed herein, a characteristic of the signals generated responsive to the movement of the individual thumb wheels is proportional to the rate of change of displacement of the corresponding thumb wheel. In FIGS. 1 and 4, this characteristic is the amplitude of an analog signal. In FIG. 2, this characteristic is the frequency of a pulse signal. As the thumb wheel is displaced, the characteristic does not increase proportionately with the displacement. Thus, there is no positional reference with respect to which these signals are generated, and the thumb wheels do not need stops to limit their angular displacement. Only after the individual signals are combined, do they represent a displacement from a reference position. At this point, however, because such displacement is the sum of the displacements of the individual thumb wheels, it is compatible with the authority of the feel system.

What is claimed is:

1. A positional control system comprising:
a first physically displaceable input member;
means for generating a first signal that has a characteristic representative of the rate of change of the displacement of the first input member;
a second physically displaceable input member;
means for generating a second signal that has a characteristic representative of the rate of change of the displacement of the second input member;
a physically displaceable output member;
means for generating a third signal that has a characteristic representative of the movement of the output member; and
means responsive to the first, second, and third signals for actuating the output member such that the displacement of the output member is proportional to the sum of the displacements of the first and second input members.

2. The control system of claim 1, in which the actuating means comprises means for combining the first and second signals to form a fourth signal that has a characteristic representative of the sum of the characteristics of the first and second signals and means responsive to the difference between the characteristic of the fourth signal and the characteristic of the third signal for positioning the output member.

3. The control system of claim 2, in which the characteristic of the third signal is the same as the characteristic of the fourth signal and is representative of the rate of change of the displacement of the output member.

4. The control system of claim 3, in which the characteristic of the first, second, third, and fourth signals is amplitude, the combining means is a signal-summing junction to which the first and second, signals are applied, and the positioning means comprises a motor connected to the output member to position it and means for coupling the output of the summing junction to the input of the motor.

5. The control system of claim 4, in which the coupling means includes a normally open switch that closes when the amplitude of the first and second signal exceeds a predetermined threshold level.

6. The control system of claim 5, in which the coupling means also includes a signal amplifier connected between the summing junction and the switch.

7. The control system of claim 6, in which a unilateral coupling device connects the motor to the output member.

8. The control system of claim 1, in which the third signal is representative of the rate of change of the displacement of the output member and the actuating means is disabled in the absence of the first and second signals.

9. The control system of claim 2, in which the characteristic of the third signal is representative of the displacement of the output member and the positioning means comprises means for generating a fifth signal that has a characteristic representative of the integral of the characteristic of the fourth signal, means for generating a sixth signal that has a characteristic representative of the difference between the characteristics of the third and fifth signals, and a motor connected to the output member to position it responsive to the characteristic of the sixth signal.

10. The control system of claim 9, in which the characteristic of the first, second, third, fourth, fifth, and sixth signals is amplitude, the combining means is a summing junction to which the first and second signals are applied, the means for generating a first signal is a velocity generator, the means for generating a second signal is a velocity generator, the means for generating a third signal is a displacement transducer, the means for generating a fifth signal is a signal integrator, and the means for generating a sixth signal is a summing junction to which the third and fifth signals are applied.

11. The control system of claim 9, in which the characteristic of the first, second, and fourth signals is frequency, the means for generating a first signal is a pulse generator that produces a pulse each time the first input member is displaced a predetermined increment, the means for generating a second signal is a pulse generator that produces a pulse each time the second input member is displaced a predetermined increment, and the means for generating a fifth signal is a counter for registering the pulses in the fourth signal and a digital-to-analog converter for converting the number of pulses registered by the counter into an analog signal.

12. The control system of claim 1, in which the first and second input members are rotatably displaceable and free of any stops to limit their angular displacement.

13. The control system of claim 12, in which the first and second input members are each a trim introducing thumb wheel located on an aircraft control wheel, and the output member is a device that adjusts the restoring force exerted on the control wheel.

14. A displacement proportional control system comprising:
a movable input device:
a movable output device to be displaced proportionally to the displacement of the input device;
means for generating a first electrical signal that has a characteristic representative of the rate of change of displacement of the input device;
means for generating a second electrical signal that has a characteristic representative of the rate of change of displacement of the output device; and
means responsive to the difference between the characteristics of the first and second signals for positioning the output device so its rate of change of displacement is proportional to the rate of change of displacement of the input device.

15. The control system of claim 14, in which the input device is rotatably movable without stops to limit its angular displacement.

16. The control system of claim 14, additionally comprising means for applying a restoring force on the output device when it is displaced from a rest position, and the means for positioning the output device is a actuator and a unilateral coupling device connecting the actuator to the output device.

17. The control system of claim 14, in which the characteristics of the first and second signals are amplitude, and the means for positioning the output device comprises a summing junction to which the first and second signals are applied, an actuator that positions the output device responsive to an electrical input, and an electrical connection between the output of the summing junction and the input of the actuator.

18. The control system of claim 17, in which the electrical connection includes a normally open switch that closes while the amplitude of the first electrical signal exceeds a predetermined threshold level.

19. The control system of claim 21, in which the connection also includes a signal amplifier between the output of the summing junction and the switch.

20. The control system of claim 19, in which a threshold detector is provided, the input of the threshold detector being responsive to the first signal-generating means to produce a switch-closing signal only when the first signal exceeds the threshold level.

21. The control system of claim 18, in which the positioning means is an actuator coupled to the output device by a unilateral coupling device.

22. a displacement proportional control system comprising:
a movable input device;
a movable output device to be displaced proportionally to the displacement of the input device;
means for generating a pulse corresponding to each increment of displacement of the input device;
means for counting the generated pulses;
means for generating a control signal that has an amplitude representative of the number of pulses counted by the counting means;
means for generating a followup signal that has an amplitude representative of the displacement of the output device; and
means responsive to the amplitude difference between the control signal and the followup signal for positioning the output device.

23. The control system of claim 22, in which the signals are electrical and the positioning means comprises a summing junction to which the control signal and followup signal are applied, and actuator for driving the output device, the actuator having an electrical input, and an electrical connection between the output of the summing junction and the electrical input of the actuator.

24. The control system of claim 23, in which the input device is movable in two directions, the pulse-generating means generates a pair of pulses for each increment of displacement of the input device, the relative phase of the pair of pulses determining the direction of displacement of the input device and the counting means comprises a reversible digital counter, means for sensing the relative phase between each pair of pulses generated by the pulse-generating means, and means responsive to the sensing means for controlling the direction of the digital counter.

25. A displacement proportional control system comprising:
a movable input device;
a movable output device to be displaced proportionally to the displacement of the input device;
means for generating a first signal that has an amplitude representative of the rate of change of the displacement of the input device;
means for generating a command signal that has an amplitude representative of the integral of the first signal amplitude;
means for generating a followup signal that has an amplitude representative of the displacement of the output device; and
means responsive to the amplitude difference between the command signal and the followup signal for positioning the output device.

26. The control system of claim 25, in which the signals are electrical and the positioning means comprises a summing junction to which the command signal and the followup signal are applied, and actuator for driving the output device, the actuator having an electrical input, and an electrical connection between the output of the summing junction and the electrical input of the actuator.

27. A control system comprising:
a first input device having a variable parameter;
means for generating a first signal that has a characteristic representative of the rate of change of the parameter of the first input device;
a second input device having a variable parameter that is the same as the variable parameter of the first input device;
means for generating a second signal that has a characteristic representative of the rate of change of the parameter of the second input device;
an output device having a variable parameter to be controlled;
means for generating a third signal that has a characteristic related to the parameter of the output device; and
means responsive to the first, second, and third signals for controlling the parameter of the output device such that the parameter of the output device is proportional to the sum of the parameters of the first and second input devices.

28. The control system of claim 27, in which the characteristic of the third signal is representative of the rate of change of the parameter of the output device and the controlling means comprises means for generating a command signal representative of the sum of the first and second signals minus the third signal and an actuator responsive to the command signal to control the parameter of the output device such that the rate of change of the parameter of the output device follows the sum of the rate of change of the parameters of the input devices.

29. The control system of claim 27, in which the characteristic of the third signal is representative of the parameter per se of the output device and the controlling means comprises means for generating a fourth signal representative of the sum of the first and second signals, means for integrating the fourth signal to generate a fifth signal, means for generating a sixth signal representative of the difference between the fifth signal and the third signal, and an actuator responsive to the sixth signal to change the parameter of the output device.

30. The control system of claim 7, in which the third signal is representative of the rate of change of the displacement of the output member so the rate of change of the displacement of the output member follows the sum of the rate of change of the displacements of the input members.

31. The control system of claim 30, additionally comprising first and second aircraft control wheels and the first and second input members are trim-introducing thumb wheels located on the respective aircraft control wheels, and the output member is a device that adjusts the restoring force exerted on the control wheels.

32. The control system of claim 14, in which the positioning means is an actuator coupled to the output device by a unilateral coupling device.

UNITED STATES PATENT OFFICE
CERTIFICATE OF CORRECTION

Patent No. 3,604,664      Dated September 14, 1971

Inventor(s) Francis J. Mahoney

It is certified that error appears in the above-identified patent and that said Letters Patent are hereby corrected as shown below:

Patent column 4, line 65, --the-- should be inserted between "at" and "one";

line 72, "rotatably" should be --rotatable--.

Patent column 7, line 33, after "second" the comma should be deleted;

line 39, "first and second" should be --first or second--.

Patent column 8, line 36, "a actuator" should be --an actuator--;

line 60, at the beginning of claim 22, "a" should be --A--.

Signed and sealed this 10th day of October 1972.

(SEAL)
Attest:

EDWARD M. FLETCHER, JR.      ROBERT GOTTSCHALK
Attesting Officer      Commissioner of Patents